UNITED STATES PATENT OFFICE.

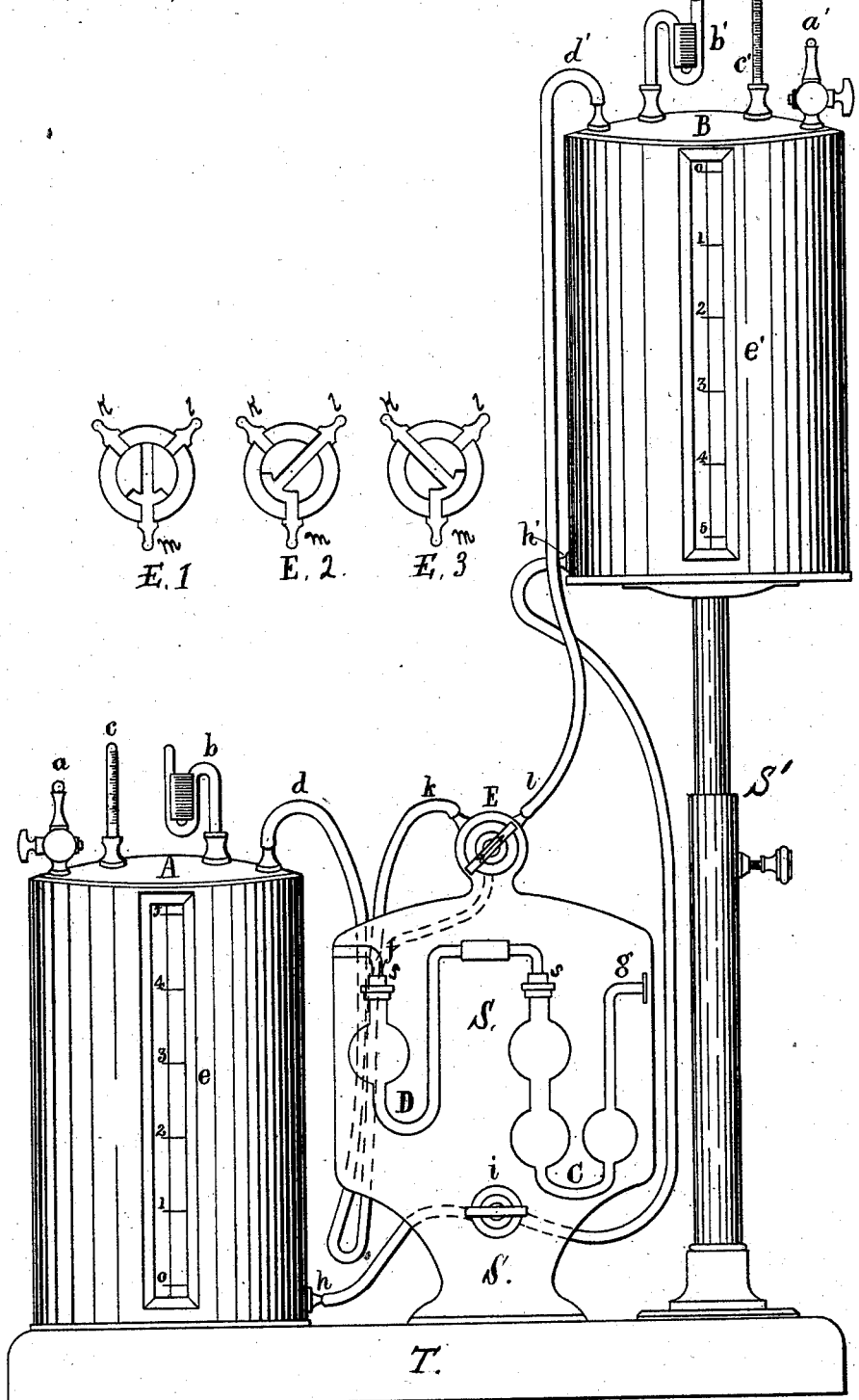

AUGUST T. SCHUESSLER, OF NEWARK, NEW JERSEY.

IMPROVEMENT IN APPARATUS FOR GAS-ANALYSIS.

Specification forming part of Letters Patent No. 222,843, dated December 23, 1879; application filed April 28, 1879.

*To all whom it may concern:*

Be it known that I, AUGUST THEODORE SCHUESSLER, of Newark, New Jersey, have invented a new and useful Apparatus and Mode of Analyzing Illuminating-Gases, &c., by means of forcing those gases through a sufficiently-high column of absorbing liquid, whereby the gases, being divided into minute bubbles, insure a perfect absorption of one or the other of their constituents, and again by the rapid change of color the exhaustion of the absorbing liquid will be observed with ease by the operator; and I do hereby declare that the following is a full and clear description of the apparatus and mode, reference being had to the annexed drawings, making a part of this specification.

My invention relates to an improved apparatus for analyzing illuminating and other gases; and it consists in a combination of two aspirators with two testing vessels or receivers, so arranged that the aspirators may serve as meters for measuring the bulk of the gas tested, and may serve to deliver and measure any volume of gas by a continuous process, while the combination of the two test-receivers with the aspirators affords an exact index of the point of saturation of the testing liquid or agent.

My drawings, illustrating my invention, consist of a general view, in elevation, of two aspirators with their connections to the test-receivers, and of three detached views, E′, E², and E³, showing the relative positions of the plug in the three-way cock when closed, and in connection, respectively, with the aspirators B and A.

My apparatus consists of a stand, S, for supporting the test-receivers and connections between the aspirators, and of the two aspirators A and B, one of which is always elevated upon a column, S′, while the other sits upon the table T, which supports the column and the stand.

$d$ and $d'$ are flexible connections between the tops of the aspirators, (as rubber hose,) and are united by a three-way cock, E. $h$ and $h'$ are similar connections between the bottoms of the receivers, and are similarly united by the cock $i$.

C is the larger test-receiver, and is connected at $g$ with the supply of gas to be tested. D is a smaller test-receiver in communication with the bottom outlet of the three-way cock E, and in open connection with the receiver C, so that the gas may flow through both the receivers to the cock E, and thence to either of the aspirators which is elevated upon the column S′ during the test.

The pipes $d$, $d'$, $h$, and $h'$ are all of sufficient length to permit the elevation of either aspirator upon the column S′, when desired. The outlets of the three-way cock are lettered $k$, $l$, and $m$, the former leading to the pipes $d$ $d'$, and the latter to the pipe $f$.

The operation of my apparatus is as follows, and will be described as applied to testing the amount of sulphureted hydrogen in coal-gas: The aspirator elevated upon the column S′ is filled with water, and the cock $i$ is closed to prevent its flow into the lower aspirator. The receiver C is now filled with a solution of nitrate of silver holding a definite weight of the salt in solution. The volume of sulphureted hydrogen that this solution will absorb being already known, the object of my invention is to indicate the precise point in the flow of the tested gas through the solution when complete saturation of the same is reached; and for this object I provide the other receiver, D, in which I place a small quantity of a dilute solution of nitro-prusside of potash. The bulk of this test-liquid being so small, and its color being so readily changed in presence of sulphureted hydrogen, its appearance indicates immediately when the said gas passes through the receiver C without being absorbed.

The receivers C and D are shown of U form, and provided with stoppers $s$, through which they may be filled; and to divide the gas in minute bubbles, and expose it most fully to the action of the liquids, I fill the receivers with broken glass tubes or other porous substances adapted to break up the current of the gas completely.

To test the coal-gas with the apparatus arranged, as described, the passages $l$ and $m$ in the three-way cock are connected, as shown in Fig. E², and the cock $i$ being opened, the water flows out of aspirator B into A, leaving a vacuum in B, into which the coal-gas is drawn through the receivers C and D. The operator now observes the color of the liquid in the receiver D, and as soon as a bluish or purplish tint appears, he closes the cock $i$, and can readily perceive upon a scale, $e'$, attached to the aspirator receiving the gas, what amount of gas has passed through the receivers, and can readily calculate the amount of sulphureted hydrogen in a given number of feet of the same coal-gas.

The aspirators should be made of some known capacity, as one-fifth, one-tenth, or one-twentieth of a cubic foot; and if the absorbing solution in receiver C is capable of absorbing a known weight of the sulphureted hydrogen, that amount must exist in the gas passed into the aspirator before the liquid in receiver D was affected in color.

I am aware that gases have been tested heretofore by passing the same through test-liquids; but my improvement consists in combining the aspirators with the test-receivers in such a manner that the aspirator acts as a meter to register the amount of gas passed through the testing liquid.

By the apparatus I have described, the testing operation may be made continuous, and volumes of gas much greater than the capacity of the aspirators be almost continuously drawn through the same receivers, thus accomplishing with a very small apparatus and very small quantity of water what has hitherto required a much larger amount.

To effect this object, it is only necessary to elevate the lower aspirator upon the column $S'$ when the one first elevated is filled with gas, and its contained water has all flowed into the lower aspirator.

An air cock, $a\ a'$, is provided in the top of each aspirator to permit the escape of the gas or contained air as the water enters at the bottom, and thermometers $c'$ and $c'$ and gages $b\ b'$ are provided to indicate the temperature and pressure at which each experiment is performed, so that the observed results may be reduced to a temperature of 60° Fahrenheit and thirty inches of the barometer.

The cock E is placed in connection with the aspirator A when elevated on the column $S'$, as shown in Fig. $E^3$, and is closed while the aspirators are being moved, as shown in Fig. $E'$.

When used in testing other gases suitable liquids are placed in the receivers C and D, the former being the absorbing-vessel and the latter the indicator, its contents being unaffected until the absorbing liquid is saturated with the gas sought to be detected.

This apparatus may also be used for testing the specific gravity of gases, the air-cock $a$ upon the lower aspirator being provided with a small outlet, as now used in Bunsen's specific-gravity apparatus.

As my apparatus is so constructed that the gas is thoroughly diffused through the testing-liquids, and I provide means for arresting its passage instantaneously, it will be seen that much more exact results can be obtained than by the usual tests, in which the gases are allowed to bubble freely through a large bulk of liquid and have to be subsequently measured, while in my apparatus the reading of the scale $e$ or $e'$ gives the precise bulk of the gas tested simultaneously with the indications of the test-receiver D.

I therefore claim my invention in the following manner:

1. The combination of an aspirator of known capacity, graduated to serve as a meter, with a receiver containing an absorbing material and a receiver containing an indicating material, the whole connected and operated substantially as and for the purpose described.

2. The combination of the two aspirators A and B with the testing-receivers C and D, and with suitable cocks and connections to test a large volume of gas by a continuous intermittent operation, substantially as herein described.

3. The porous filling for the receiver C or D, in combination with the absorbing or indicating material used for testing the gas by the process herein described.

AUG. TH. SCHUESSLER.

Witnesses:
M. TICHENOR,
FRANK E. BRADNER.